US006102285A

United States Patent [19]
Elias

[11] Patent Number: 6,102,285
[45] Date of Patent: Aug. 15, 2000

[54] PARKING METER SYSTEM

[76] Inventor: Josef Elias, 153-4th Ave., San Francisco, Calif. 94118

[21] Appl. No.: 09/063,626

[22] Filed: Apr. 20, 1998

Related U.S. Application Data

[63] Continuation-in-part of application No. 08/514,759, Aug. 14, 1995, abandoned.

[51] Int. Cl.[7] .......... G06K 7/10
[52] U.S. Cl. .......... 235/377; 235/384; 235/449
[58] Field of Search .......... 235/377, 375, 235/376, 384, 381, 449, 492

[56] References Cited

U.S. PATENT DOCUMENTS

| | | | |
|---|---|---|---|
| 3,959,632 | 5/1976 | Trehn et al. | 235/379 X |
| 4,310,890 | 1/1982 | Trehn et al. | 364/467 |
| 4,379,334 | 4/1983 | Feagins, Jr. et al. | 364/467 |
| 4,460,965 | 7/1984 | Trehn et al. | 235/379 X |
| 4,717,815 | 1/1988 | Tomer | 235/384 X |
| 4,847,776 | 7/1989 | Huang | 364/467 |
| 4,861,971 | 8/1989 | Chan | 231/381 |
| 4,876,540 | 10/1989 | Berthon et al. | 340/932.2 |
| 4,880,097 | 11/1989 | Speas | 235/492 X |
| 5,382,780 | 1/1995 | Carmen | 235/384 |
| 5,475,373 | 12/1995 | Speas | 340/815.58 |

FOREIGN PATENT DOCUMENTS

| | | |
|---|---|---|
| 0402821 | 12/1990 | European Pat. Off. . |
| 0447312 | 9/1991 | European Pat. Off. . |
| 60-215280 | 10/1985 | Japan . |
| 8912286 | 12/1989 | WIPO . |

*Primary Examiner*—Michael G Lee

[57] ABSTRACT

A parking metering system where the metering device is maintained within the vehicle for external inspection by a parking control person, the metering device in one embodiment having a display screen and light keys for visually displaying parking rate information by zone and remaining time, the metering device accounting for monies by use of a prepurchased debit card or account settlement by service centers, and in another embodiment the metering device includes a radio transmitter for short distance transmission of rate data and time data to a parking control officer equipped with a pager-like receiving device.

8 Claims, 2 Drawing Sheets

PARKING METER SYSTEM

This application is a continuation-in-part application of my prior application of the same title, Ser. No. 08/514,759 filed Aug. 14, 1995, now abandoned.

BACKGROUND OF THE INVENTION

This invention relates to a parking metering system for vehicles in which the metering device is maintained within the vehicle parked. The metering device generates metering data that is externally accessible by a meter control authority for regulating authorized parking, particularly in a controlled public parking place. The metering device is preferably mounted on the top of the dash board proximate the front windshield at the driver's side for visual inspection by a meter control officer. As an alternative, the status of the metering device may be externally accessed by the control officer electronically, using a specially designed receiver for receiving transmitted data in a signal from the metering device. In this embodiment, the receiver carried by the control officer becomes an element in the metering system.

In most urban or commercial areas, regulating and controlling the parking at available curb-side parking spots is essential for supporting local commercial activity. Where parking is unregulated, desirable curb-side parking is frequently occupied by local workers. Workers are early to the spot and leave their car for the duration of the day. Unregulated, the choicest parking spots are taken by the employees and others who work reasonably near the stores of their employment. To prevent downtown and local shopping areas from becoming stagnate, it was apparent that frequent turnover of parked vehicles was desirable to free prime parking locations for shoppers and others engaging in commercial activity of short duration.

As a result, the parking meter was devised to limit the time that a vehicle could occupy a premium parking spot close to commercial enterprises such as stores, professional buildings, service facilities and other locations where customers and clients are served or are partaking in enjoyable activities such as restaurants and cafes. The parking meter regulates parking by limiting the time a vehicle can continuously occupy a designated parking spot. As a result, coin accepting devices with mechanisms to measure time limits were devised, and the coin operated devices were mounted on steel poles and set deeply into the sidewalk. Parking limits were set in increments of one hour, thirty minutes, ten minutes, or in certain instances, multiple hours, depending on the desirability to the location of local commercial entities or recreation areas, such as beaches and parks.

To be effective, the time limits had to be enforced and control officers were therefore assigned to patrol parking areas and ticket those vehicles occupying spots in which the parking limit had expired. To prevent occupancy of a parking space by a single vehicle for multiple term limits, the parking control officer periodically would chalk the wheels of parked cars to insure that the occupant is simply not returning to his vehicle to feed the meter and take advantage of multiple time limits.

Although the parking meters sometimes became jammed during use, or the poles on which the parking meter was mounted occasionally became bent by accidental or deliberate contact with a vehicle, pole-mounted parking meters operated reasonably effectively. The curb-side parking spaces in many urban locations has become extremely desirable. As a consequence, the cost of parking for a given time has dramatically increased. Since the meters in such locations store a quantity of higher value coins, the parking meter has become a target for theft.

To prevent theft of coins from the parking meter, improvements have been made in the strength of the storage chamber and the lock. However, it then became the practice to steal the entire meter by severing the meter from the pole by use of a pipe cutter. This resulted in the added cost of replacing the meter as well as the loss of the revenue. Various strategies to prevent theft of the meter have included the use of a rotatable sleeve around the meter pole to prevent the use of a cutter, or oval poles. It then became a practice to extract the pole by force resulting in both the loss of the meter and pole, and damage to the curb-side.

In order to reduce the theft of money from parking meters and reduce the damage to the meter itself, experimental use of a meter that accepts a credit card has been proposed. However, to he effective, the meter cannot accept coins and must be dedicated to the exclusive use of credit cards. The added accounting required for billing by use of such a meter, adds expense. In addition, the cost of the meter and the cost of gathering the data for accounting must be borne by the parking authority.

In order to eliminate most of the problems of a parking meter system of conventional design, this invention has as its object, the use of a small, portable metering device that is installed inside the vehicle and is user operated. It is also an object of this invention to enable the meter to be inspected by a parking control officer externally from the vehicle compartment to determine that the correct time and rate is applied for the location. In order to properly credit the parking authority with the fee for parking, a means for accounting is provided. It is preferred that a debit system be utilized in which the metering device includes a card reader for debiting from the debit card, a selected amount for the time desired.

Alternately, a system of crediting can be provided in which a preset amount is purchased by the user and decremented until exhausted. For convenience, this amount can be credited to the metering device via a debit card or by a credit chip that is returned to the parking authority and exchanged for a new chip. As such system becomes popularized, certain locations can be provided for users of such a metering system and the curb-side pole meters eliminated. At some time, the metering device can be installed into the vehicle at the time of manufacture.

For the convenience of the user, the debit card may be part of a city-wide transportation system wherein a debit card or transportation card can be purchased from any rail or bus terminal and used as a parking meter card as well.

SUMMARY OF THE INVENTION

This invention relates to a parking metering system that includes a metering device that is installed within the vehicle parked. As the loss of money and the expense of maintaining pole mounted parking meters increase, the desirability of an alternate system to the pole mounted parking meter becomes apparent. This invention is directed at a system of regulating and controlling parking where the parking control authority is relieved from the primary expenses of providing and maintaining parking meters. The metering device in the system of this invention comprises a small electronically operated metering device that is installed in the vehicle compartment at a location that is convenient for access by a parking control officer. The access by the control officer is external, allowing the vehicle compartment to be locked to prevent theft or damage to the vehicle being parked.

It is intended that the metering device be operated by use of a debit-type card where the entire amount of the card is transferred to the metering device on swipping the card through a card reader slot at one side of the device. Alternately, deductions from the card can be made each time the vehicle is parked in a metered zone such that the card is transferable and useable in other metering devices of the vehicles. As an additional alternative, the metering device can be credited via a plug-in chip with a prepurchased amount. The chip is returned to the authority for exchange with a substitute chip when the amount is exhausted. Preferably, the device has a series of selection buttons that are used by the vehicle occupant to select appropriate time and rate for the particular parking spot in which the vehicle is parked.

Where appropriate, certain radio frequency (r.f.) or infrared frequency (i.r.) transmissions can be used for the convenience of monitoring or accounting. In monitoring, a short range broadcast signal can be disseminated indicating that the metering device is activated at the correct rate for the zone in which the vehicle is situated.

These and other features will be apparent from a consideration of the Detailed Description of the Preferred Embodiments.

DETAILED DESCRIPTION OF THE PREFERRED EMBODIMENTS

Figure 1:
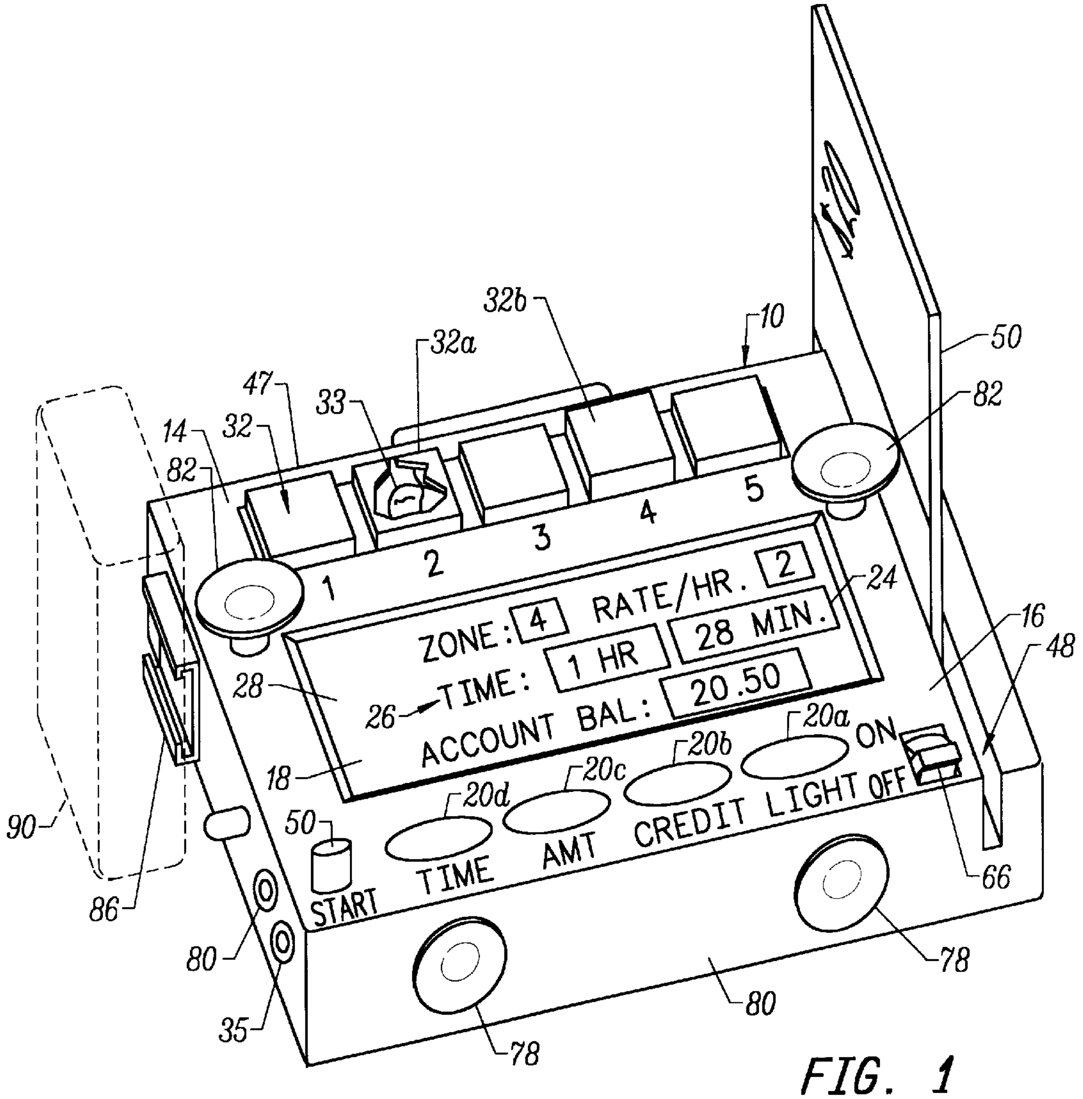
FIG. 1 is a perspective view of the metering device for the metering system.

Referring to the drawings, and in particular to FIG. 1, the metering device is shown and designated generally by the reference numeral 10. The metering device 10 may be utilized independently in a self-contained metering system, or in a wireless metering system in conjunction with an auxiliary monitoring device in the form of a remote reader 12, shown in FIG. 2. The metering device 10 has a flat, box-like housing 14 with a front 16 that includes a display screen 18. The display screen 18 is a conventional liquid crystal display (LCD) that is a low power draw with an optional back light. The back light operation of the display screen is activated by control of an option button 20*a* that is one of a series of option buttons 20*a–d* for selecting certain functions as described herein.

Figure 3:
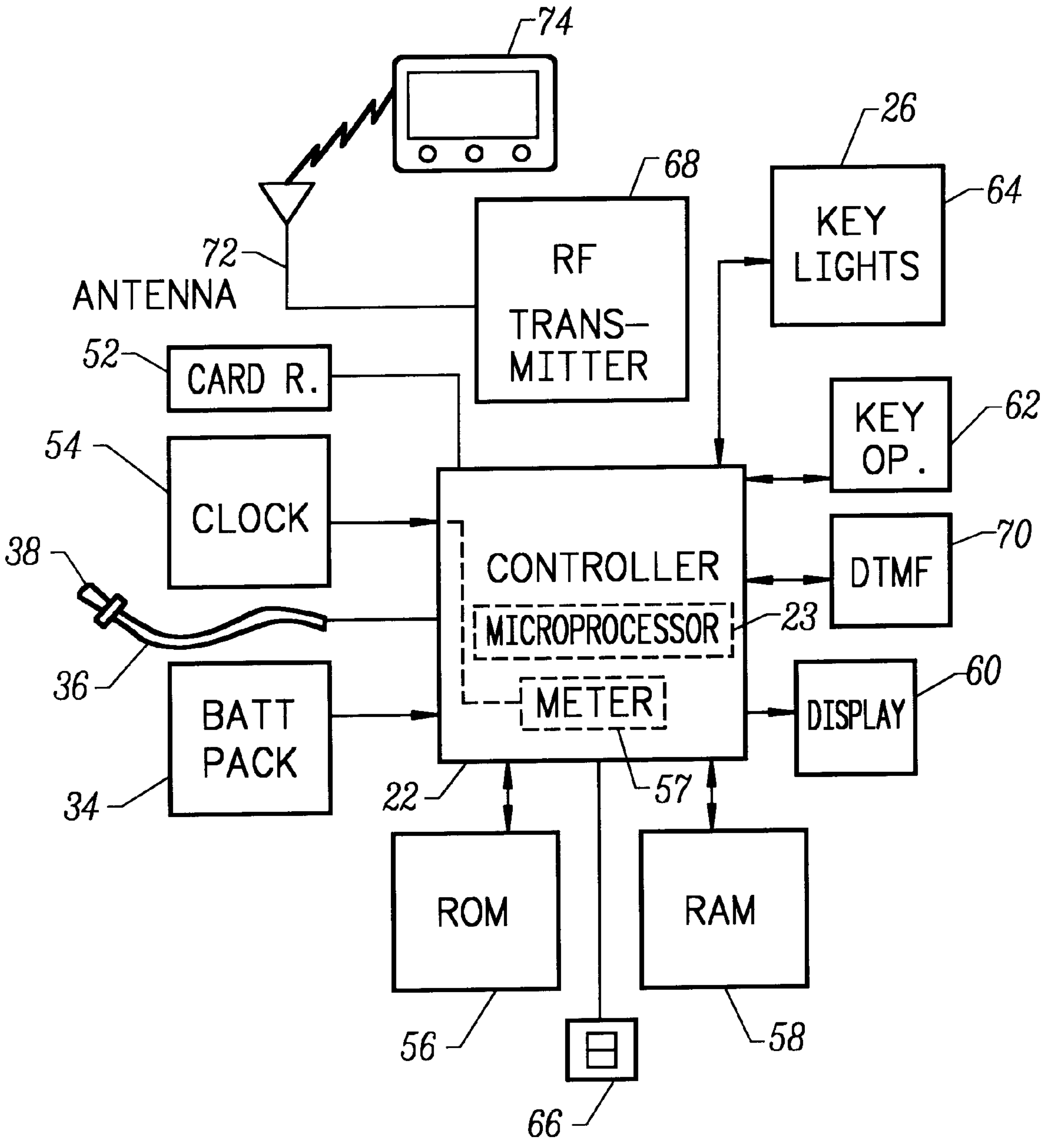
FIG. 3 is a block diagram of the electronic components for the metering device.

As shown in the schematic diagram of FIG. 3, metering device 10 includes a controller 22 with an internal microprocessor 23 for controlling and performing the various operations and functions required including the display of alphanumeric indicia 24 or other markings on the display screen 18 as shown in FIG. 1. In FIG. 1, the changing alphanumeric indicia 24 is set out in various fields, such as zone, rate per hour, time and account balance. Various field defining labels 26 are selectively displayed in display windows 28 on the display screen 18. The changing data record for each field together with the identified fields may be displayed as a group as shown in FIG. 1, or, for the convenience of a viewer shown separately in enlarged form. The latter mode would permit a parking control officer to view the screen from a greater distance. For example, in certain jurisdictions it may be required that the remaining time for an activated metering device be displayed. The time button 20*b* is depressed to continuously show the remaining time in enlarged numerals that fill the display screen 18.

In addition to the display screen 18 which is primarily for the benefit of the user, meter activation is signaled by a series of zone keys 32. The pop-up zone keys 32 are included to assist the parking control officer in visually monitoring the metering device. In the metering device 10 of FIG. 1, five zone keys 32 are shown to enable the device to operate in one of five conventional rate zones for the parking space in which the vehicle is parked and the metering device activated. For example, the five keys represent 15 min, 30 min, 1 hour, 2 hours and 10 hours for maximum times. The zone is selected by depressing and raising the appropriate button 30. Using the time button 20*d* or the amount button 20*c*, the time desired or the amount deducted from the debit card or internal credit, can be selected. Any number of zones can be accommodated by a respective number of pop-up keys 32. The zone keys 32 become alternately raised and lowered after the selected key is depressed and released. In addition, the zone keys each have an internal light such as the light 33 shown in the breakaway of the zone key 32*a* for zone 2. The light 33 is activated when the key, for example key 32*b* is raised and the meter activated. Each of the zone keys 32 is fabricated of a translucent plastic of different color for color coding the buttons according to zone. Such feature enables the parking control officer to quickly inspect the metering device and determine that the metering device is activated and activated for the particular zone in which the vehicle is parked. In the illustration of FIG. 1, zone four has been selected and the key 32*b* is shown in its raised position.

Figure 2:
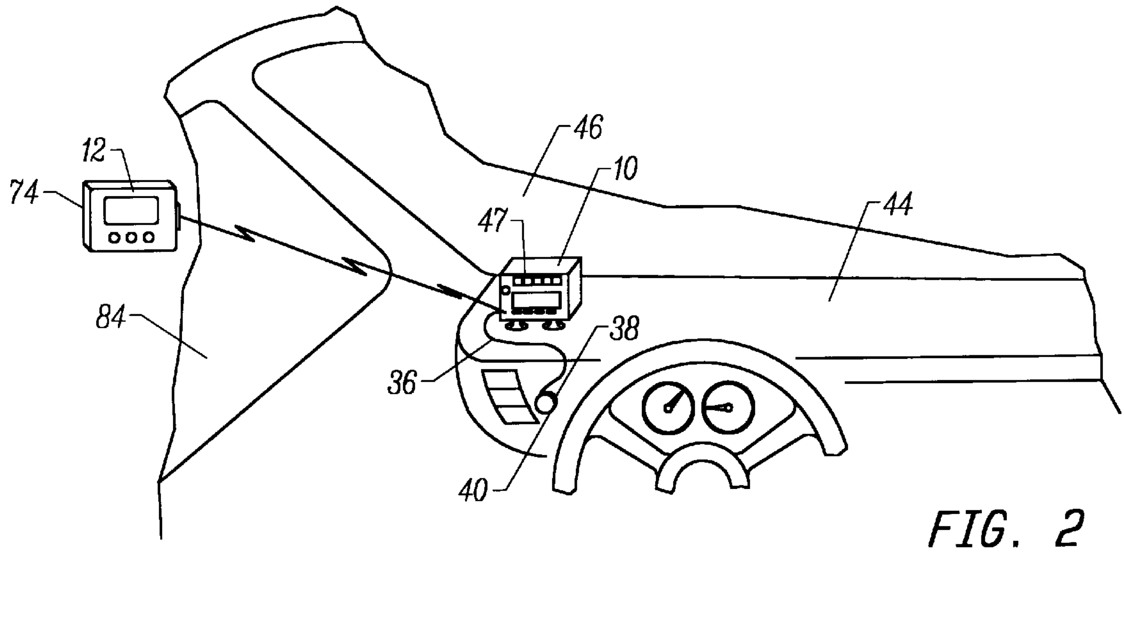
FIG. 2 is a perspective view of the metering device installed in the interior of a vehicle and monitoring device.

With reference to the schematic illustration of FIG. 3, the operation of the preferred metering device can be explained. The metering device 10 has a central controller 22 that includes an internal microprocessor 23 and the necessary electronic circuitry for integrating the associated electronic components. The controller 22 is powered by a small battery pack 34 that preferably provides 12 V DC. The meter device has a plug-in socket 35 for use with a supplemental lighter cord 36 that can be utilized as shown in FIG. 2 for drawing 12 V DC power from the vehicle battery by plugging a terminal plug 38 into the cigarette lighter 40 of the vehicle 42 shown in part in FIG. 2. The metering device 10 in FIG. 2 is mounted on the vehicle dashboard 44 proximate the front windshield 46 on the drivers side of the vehicle 42 for setting the zone and amount, but should be repositioned for convenient viewing by the parking control officer. Alternately, the zone keys 32 are mounted on the top 47 of the metering device instead of the front face 16, for convenient viewing by both the user and the parking control officer.

The metering device 10 has a magnetic card reader slot 48 for inserting a debit card 50 into the metering device 10 for deducting an appropriate amount from the card 50. The amount is preset using the amount button 20*c* which will scroll through a series of amounts until stopped on the amount required. The internal card reader 52, indicated in the schematic diagram of FIG. 3, deducts the amount from the card. The user sets the appropriate control key 32 for the zone and an internal clock 54 provides the time count for the controller 22 to process the countdown for the internal meter of an activated meter device 10. Alternate start methods may be used. For example, the meter may be activated automatically when the selected amount is entered. The metering device can be set and the internal meter activated by a start button 56.

The controller 22 has an associated read only memory 56 for storing the firmware for basic operation, for example, cooperating with the microprocessor and clock to form the internal decrementing meter 57, shown schematically, and a random access memory 58 for programs that may have parameters that vary or may require future change. For example, the internal program may limit the time selectable according to the zone rates, and prevent resetting until a period of expiration has passed to prevent the equivalent of meter feeding. In addition, the controller has a display control 60, a key control 62 for recognizing the selected zone key 32, and a power control 64 for activating a zone key light, when the zone key is selected and the metering function initiated. The device also includes an on/off power switch 66.

The metering system in this form is self-contained. By addition of a radio frequency transmitter 68 and a DTMF converter 70, a radio frequency identifying a particular metering device 10, and the selected zone and time can be transmitted from an antenna 72 and received by a pager 74 modified to respond to local, short distance signals. Converted DTMF signals which are common tone signals for telephones can be coded for message display corresponding to zone, time remaining, meter device identification, or other useful parameters. This enables a parking control officer to monitor metering devices from a distance without having to inspect each device.

The metering device 10 has a pair of suction cups 78 on the base 80 of the device to stand the device on the dashboard 44 as shown in FIG. 2. when used in the preferred embodiment as a self-contained device without the pager 74 as a monitory tool, the metering device should be positioned for convenient external viewing of the illuminated zone key 32*b* by the parking control officer. The metering device 10 also includes a pair of suction cups 82 on the front 16 enabling the device to be suction mounted to the windshield 46 or side window 84 for external viewing at distance.

In addition, the metering device 10 includes a side mounting bracket 86 and an auxiliary socket 88 for mounting and powering an auxiliary component such as a minicam 90, shown in dotted line in FIG. 1. The device may be used to monitor the vehicle when in the custody of a parking attendant or the like.

Other features can be incorporated. A credit button 20*b* is provided to see how much is stored in the metering device when a debit card is not incrementally debited, but adds the whole purchase amount to the metering device.

It is to be understood that other means could be used to make meter time available including a removable chip plug that can be withdrawn and taken to a service outlet where an amount paid can be added to the chip and become a credit for draw. Similarly, while credit cards may be used, the system would require a transceiver connected to a credit center for approval, or return of the metering device to a service center for credit transfer. The convenience of a debit card, which can be vended as part of any city transportation scheme, is believed superior. For example, any machine-dispensed railway fare card could equally function as a parking meter debit card.

Although initially contemplated as an add-on component to a vehicle, it is to be understood that because of the universal implementation of parking meters, the metering device can be integral with the dashboard and installed at the time of vehicle manufacture. Additionally, the metering device can be combined with other electronic systems designed for the modern vehicle, such as collision avoidance devices, radar detectors and other dashboard mounted devices. Similarly, marketing programs can be used to encourage the use of the metering device. For example, discount debit cards providing twenty dollar meter value can be dispensed for fifteen dollars. Because of the transfer of responsibility for the metering device from the municipality to the vehicle user, heavy discounting is advantageous for both parties to the transaction.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A parking metering system for time regulated parking spaces comprising:

an electronic metering device having a housing adapted for placement inside a motor vehicle, the metering device having a meter with indicator means for generating a visual signal perceivable from outside the motor vehicle indicating meter activation, wherein the indicator means includes an inspection light that is illuminated when activated, an activated inspection light comprising the visual signal wherein the activated inspection light is perceivable from outside the vehicle at a short distance from the vehicle during day or night on quick visual inspection by a parking control officer, a timer means for maintaining the signal indicating meter activation during an interval of time, an activation means for activating the meter of the metering device and concurrently activating the inspection light of the indicator means, wherein the activation means includes an accounting means for charging a sum of money for activation of the meter for the metering device for the interval of time and wherein the inspection light remains activated during the interval of time the metering device is activated and wherein the indicator means includes a series of inspection lights, wherein each one of the series of lights corresponds to a different zone rate, and the activation means includes means for selecting a zone rate appropriate for a parking space in which a vehicle using the metering device is parked and activating one of the series of lights corresponding to the zone rate selected.

2. The parking metering system of claim 1 wherein the visual signal is one of a series of colored lights which remains lit during the interval of time the meter of the metering device is activated.

3. The parking metering system of claim 1 wherein the metering device includes a magnetic card reader, and the activation means comprises a magnetic debit card wherein the magnetic card reader deducts sums of money from the debit card corresponding to increments of time and activates the signal.

4. The parking metering system of claim 3 wherein the metering device includes user controls to select monies deductible from the debit card.

5. The parking metering system of claim 4 wherein the accounting means includes means for crediting the metering device with a sum of money for decrementing during activation of the meter of the metering device.

6. The parking meter system of claim 1 wherein each one of the series of lights is of a different color than the remaining lights in the series of lights.

7. The parking metering system of claim 6 wherein the housing has mounting means for mounting the housing on a vehicle dashboard.

8. The parking metering system of claim 6 wherein the housing has mounting means for mounting the housing on a vehicle windshield and vehicle window.

* * * * *